United States Patent [19]
Colson et al.

[11] Patent Number: 5,390,720
[45] Date of Patent: Feb. 21, 1995

[54] TUBULAR CELL WINDOW COVERING WITH UNDULATIONS ALONG THE LENGTH OF THE CELLS

[75] Inventors: Wendell B. Colson; Paul G. Swiszcz, both of Boulder; James M. Anthony, Denver, all of Colo.

[73] Assignee: Hunter Douglas, Inc., Upper Saddle River, N.J.

[21] Appl. No.: 89,267

[22] Filed: Jul. 9, 1993

[51] Int. Cl.[6] .................................................. E06B 3/94
[52] U.S. Cl. .................................................. 160/84.1 D
[58] Field of Search ............ 160/84.1 D, 84.1 C, 160/84.1 R, 370.2 B, 348; 428/116, 118, 188; 156/65, 197, 199, 204, 183, 210

[56] References Cited

U.S. PATENT DOCUMENTS

| | | |
|---|---|---|
| 4,347,887 | 9/1982 | Brown . |
| 4,446,189 | 5/1984 | Romanek .................. 156/199 X |
| 4,450,027 | 5/1984 | Colson . |
| 4,631,217 | 12/1986 | Anderson . |
| 4,647,488 | 3/1987 | Schnebly et al. . |
| 4,846,243 | 7/1989 | Schneider . |
| 5,043,039 | 8/1991 | Swiszcz .................. 160/84.1 D X |
| 5,097,884 | 3/1992 | Sevcik et al. .................. 160/84.1 D |
| 5,193,601 | 3/1993 | Corey et al. .................. 160/84.1 D |
| 5,205,333 | 4/1993 | Judkins .................. 160/84.1 D |

Primary Examiner—David M. Purol
Attorney, Agent, or Firm—Holland & Hart; Gary M. Polumbus

[57] ABSTRACT

An expandable and contractible tubular cell window covering includes a plurality of contiguous cells which have been bonded together to form a wavy or undulating pattern along the length of the cells. The undulating or wavy patterns can be created by initially stretching the cells before bonding adjacent cells and subsequently releasing the stretch so that the fibers engaged with the bonding medium remain in a stretched or separated condition while the remaining fibers are relaxed. The cells can also be bonded with an adhesive that expands on curing to create the same effect without having to prestretch the fabric before applying the bonding medium. In a third embodiment of the invention, adjacent tubular cells are bonded together with curved lines of adhesive which again create an undulating or wavy configuration along the length of each tubular cell. The methods for forming the window covering is also disclosed.

37 Claims, 8 Drawing Sheets

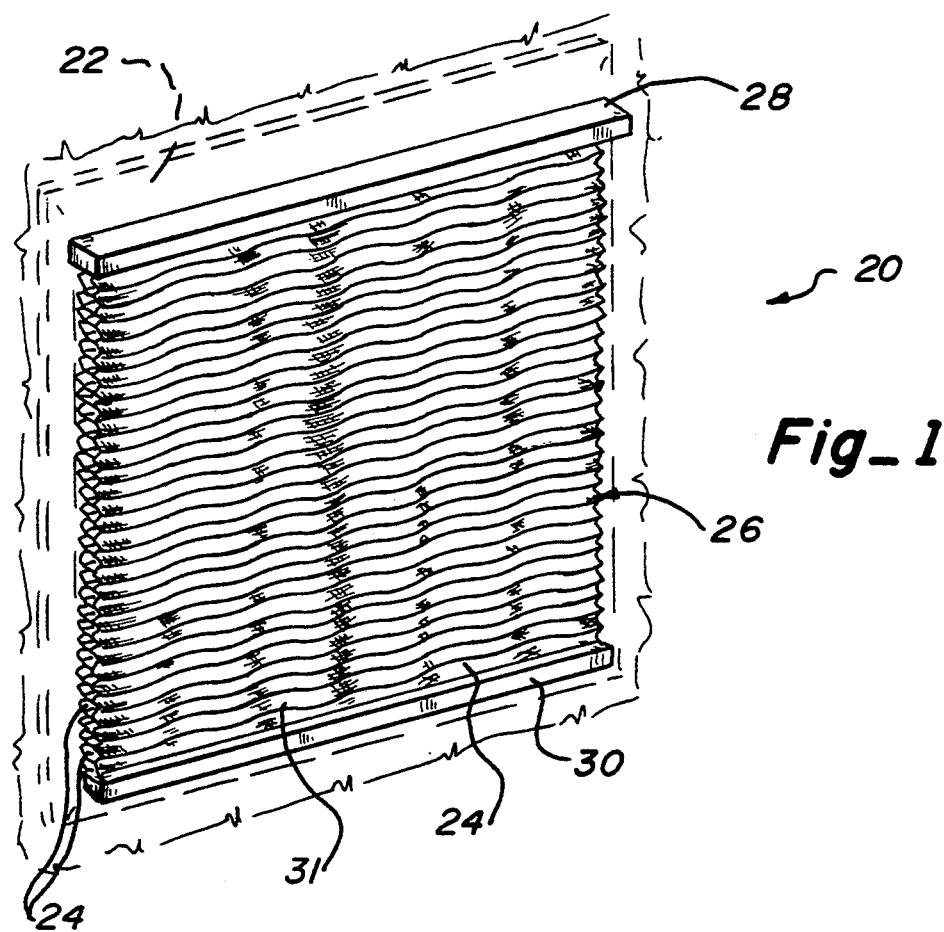
Fig_1
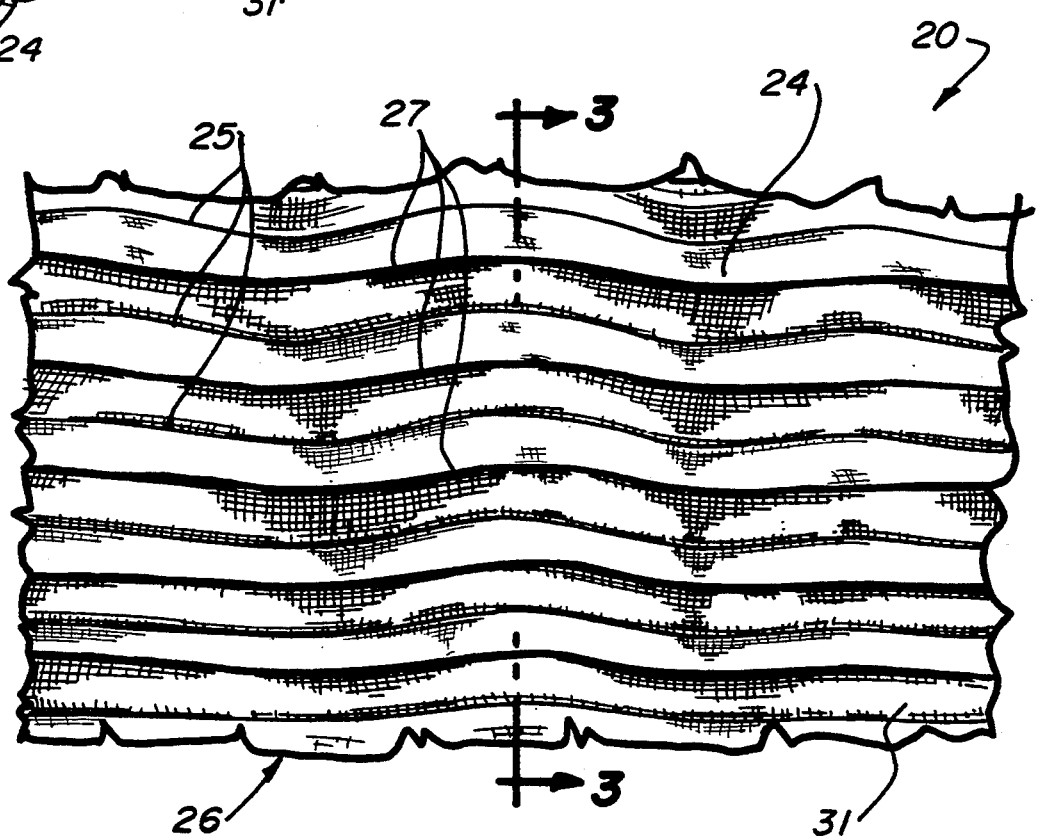
Fig_2

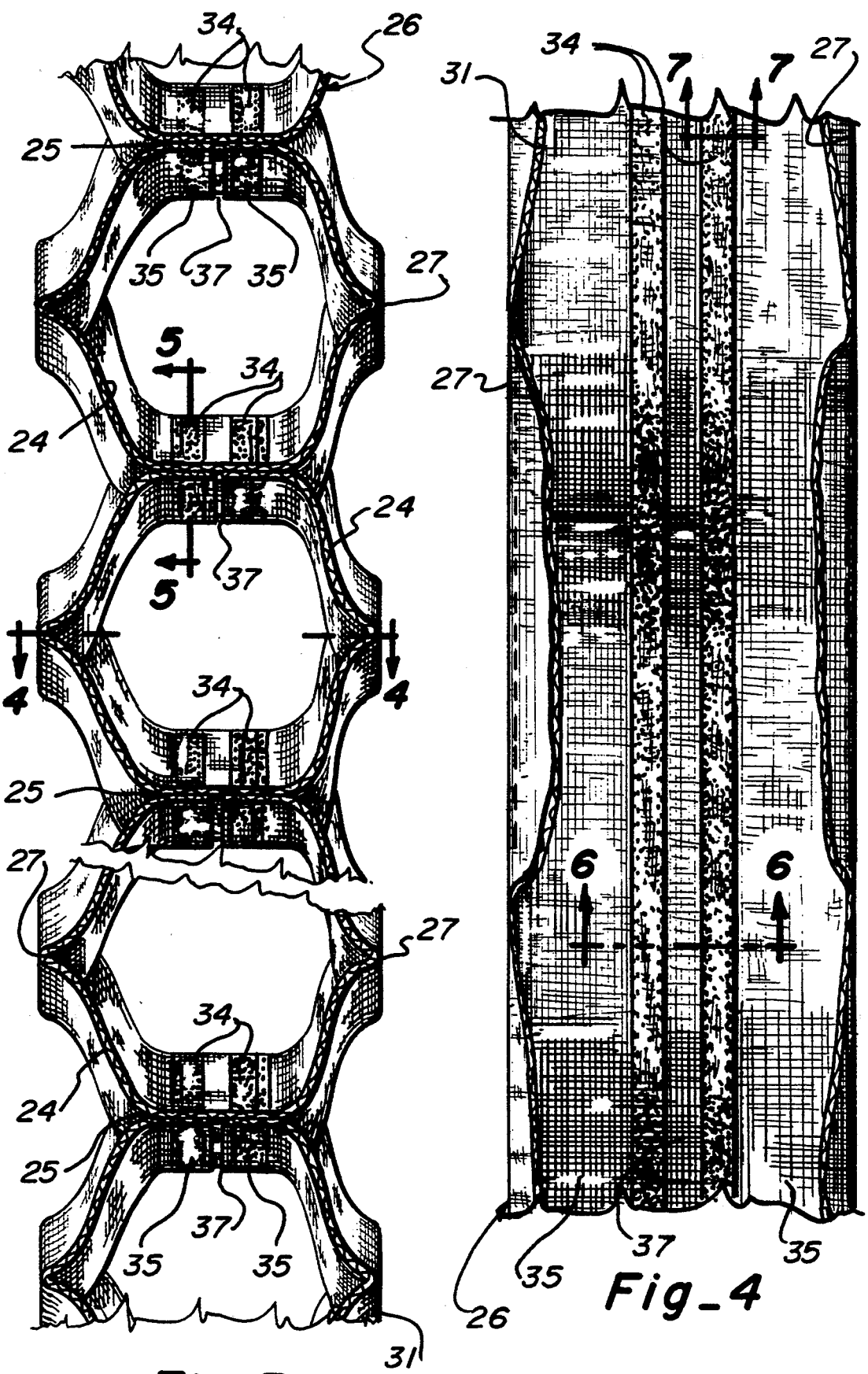
Fig_3
Fig_4

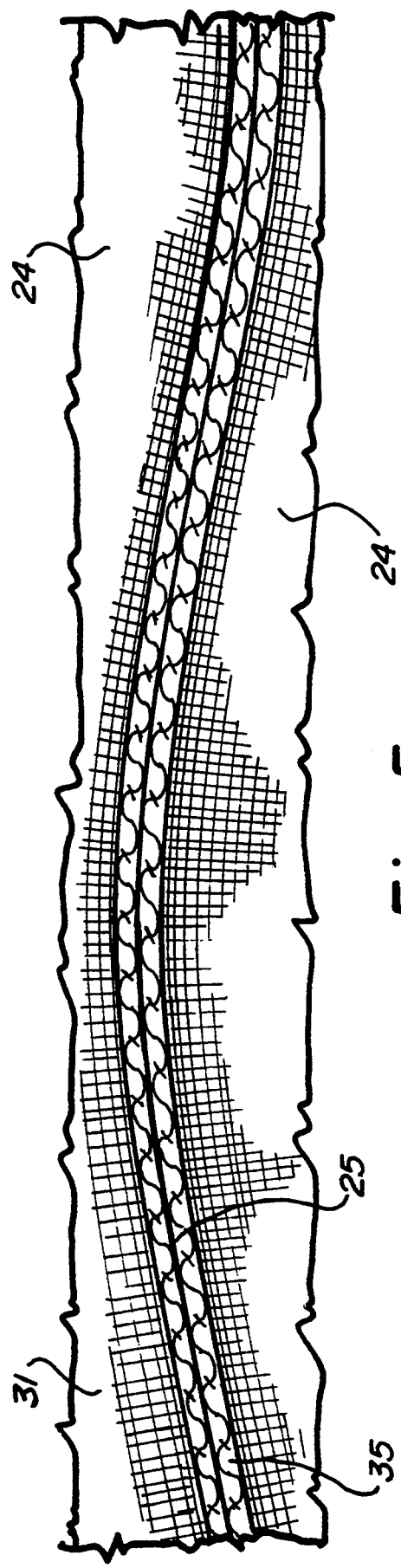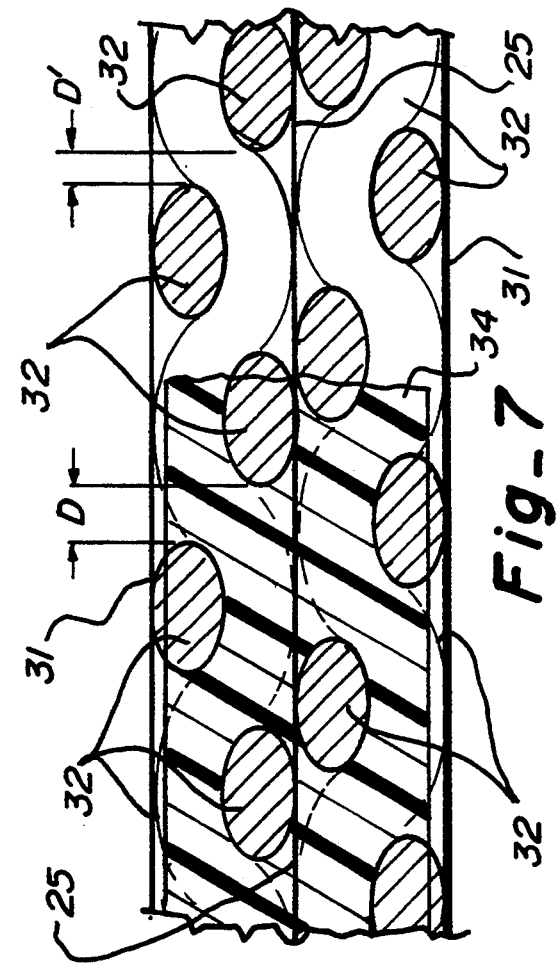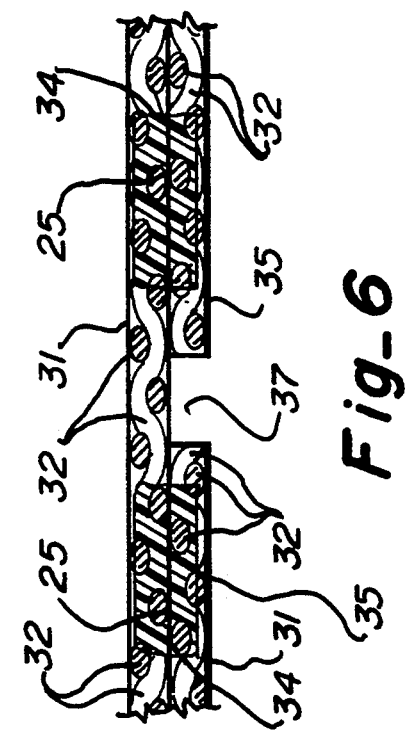

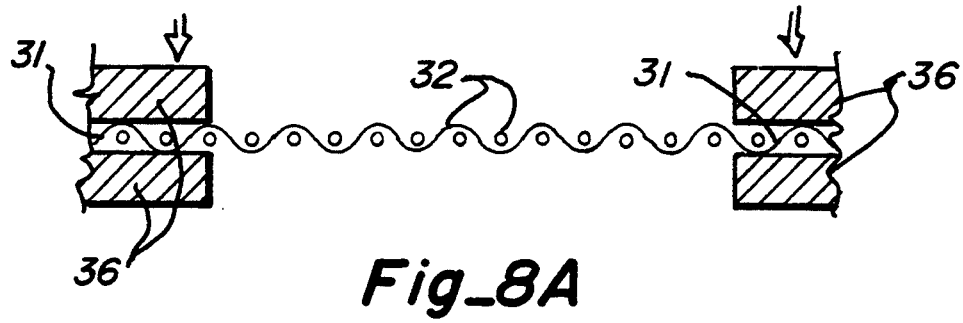
*Fig_8A*
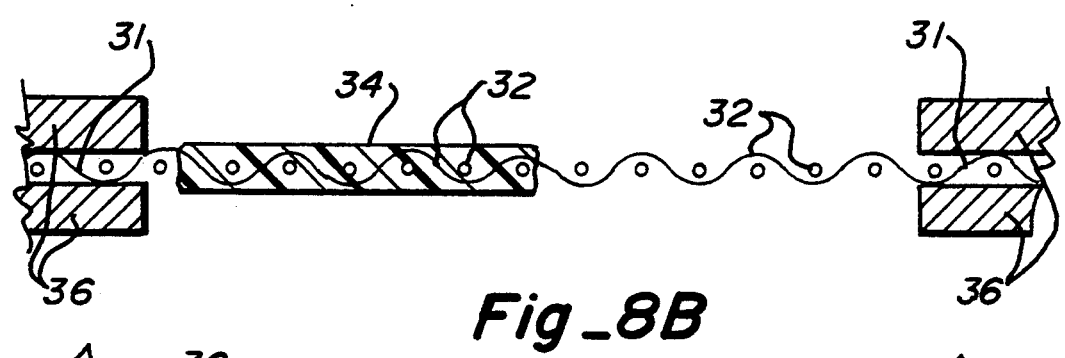
*Fig_8B*
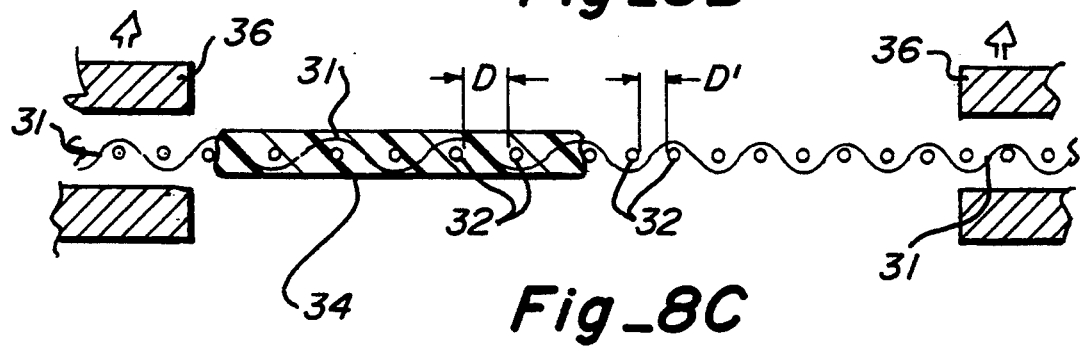
*Fig_8C*

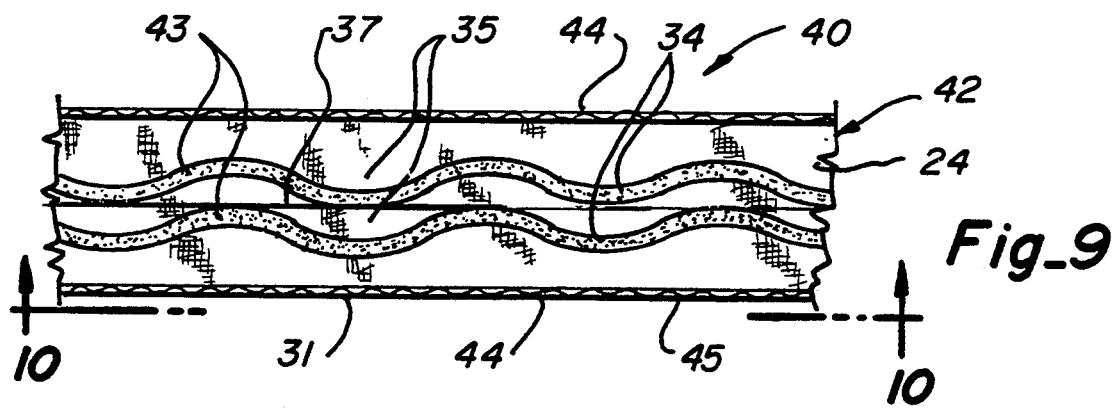
Fig_9
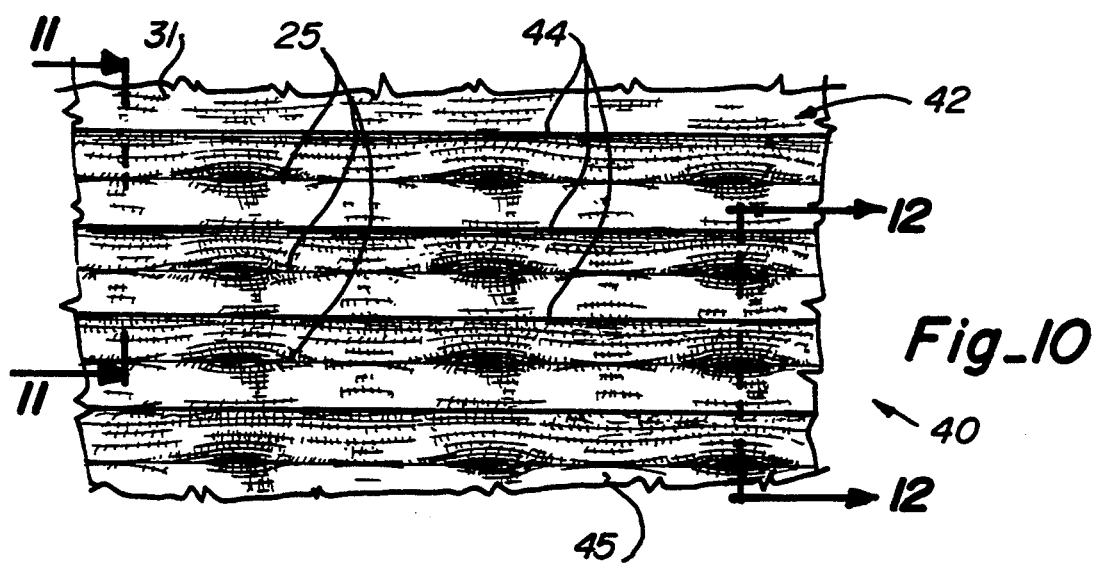
Fig_10
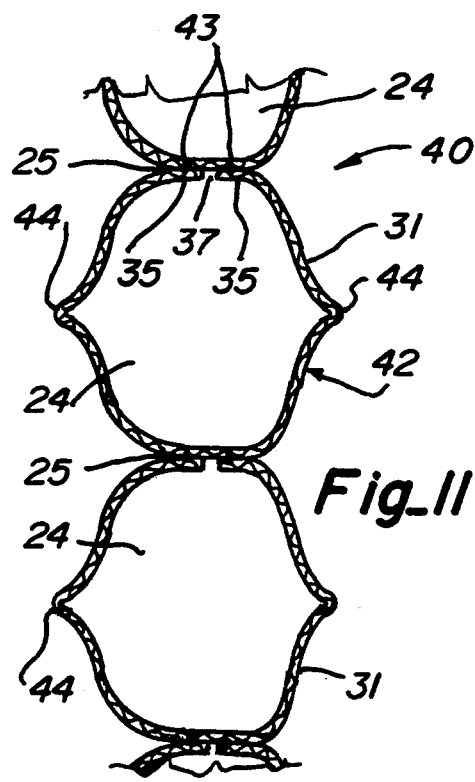
Fig_11
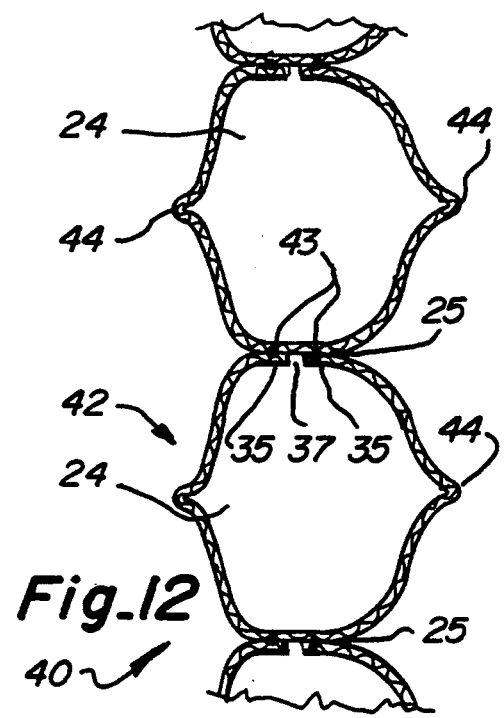
Fig_12

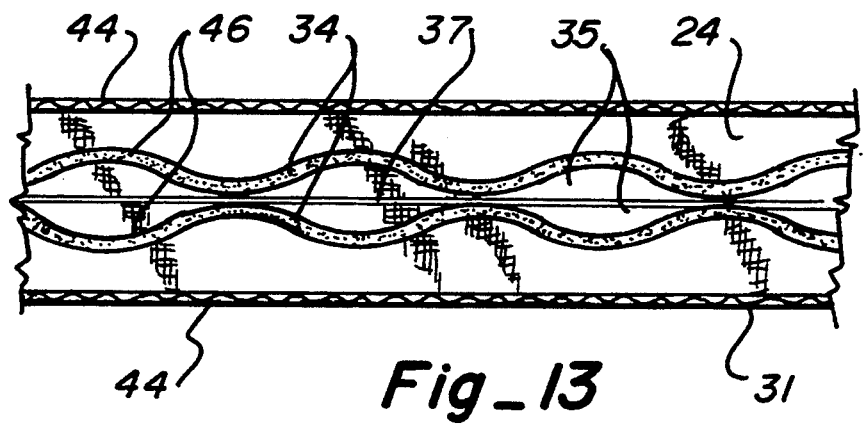
Fig_13
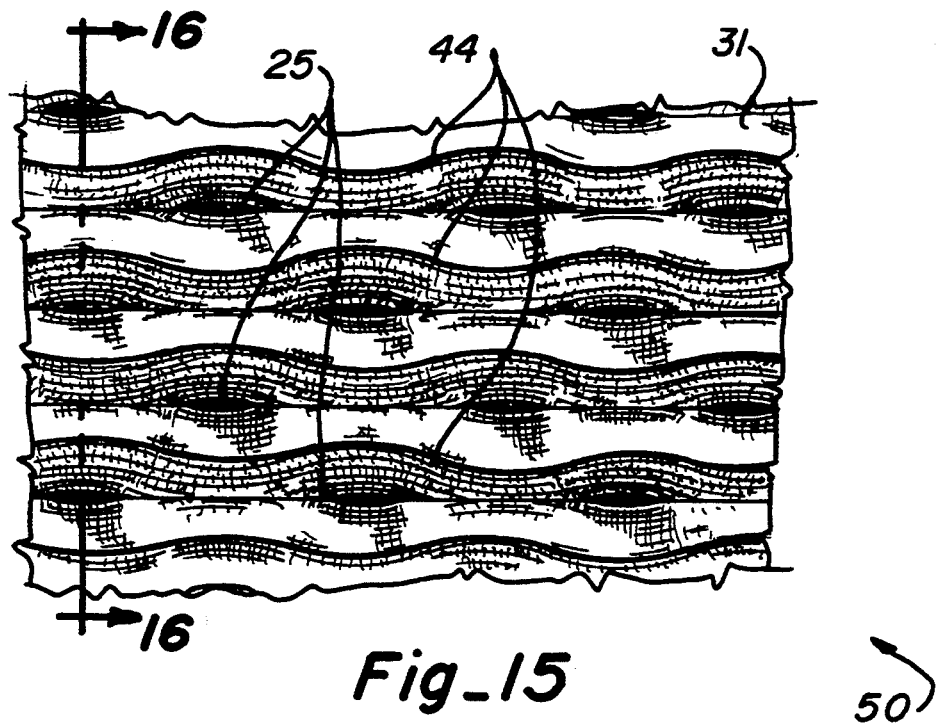
Fig_15
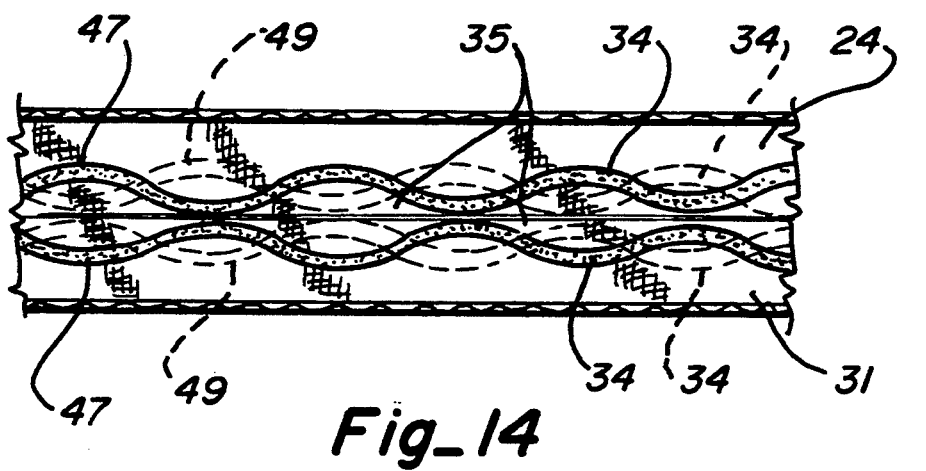
Fig_14

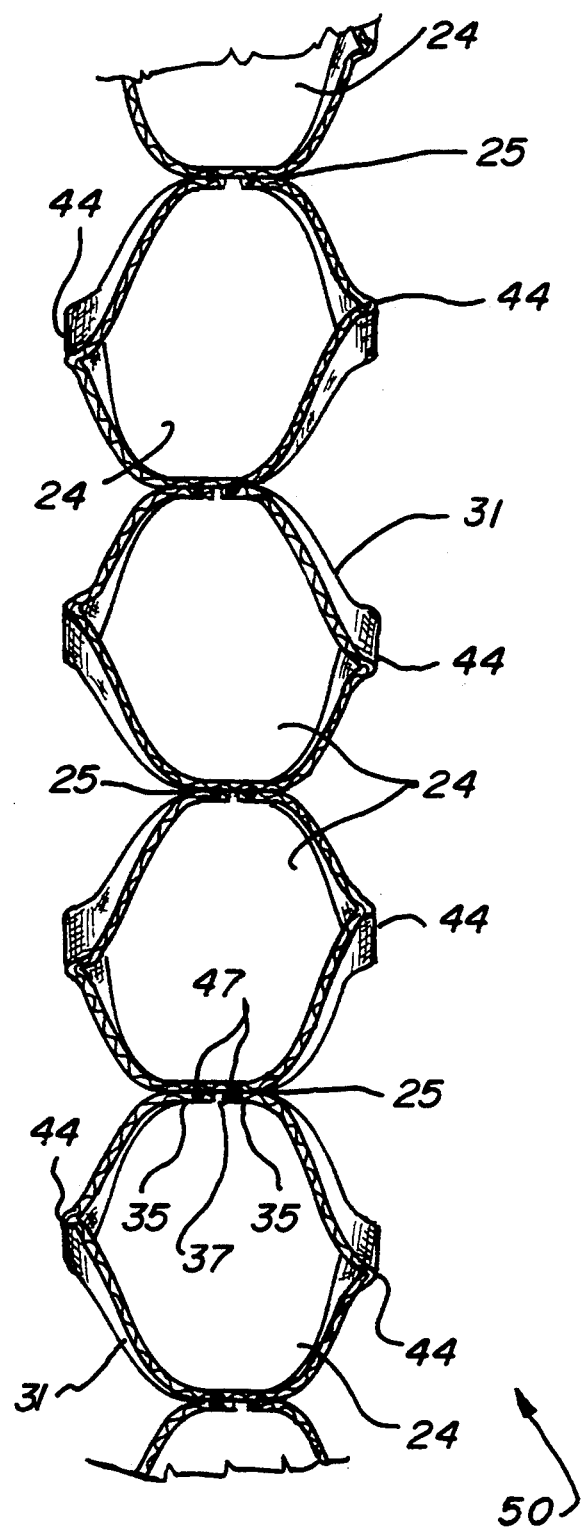
Fig_16

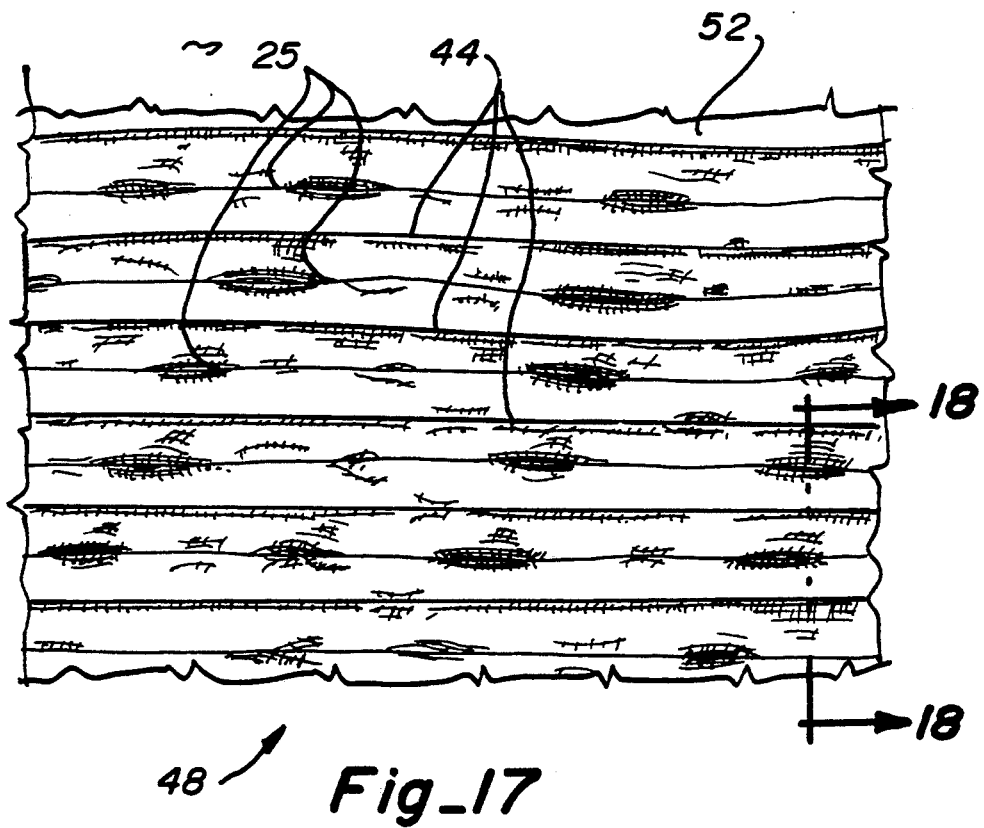
Fig_17
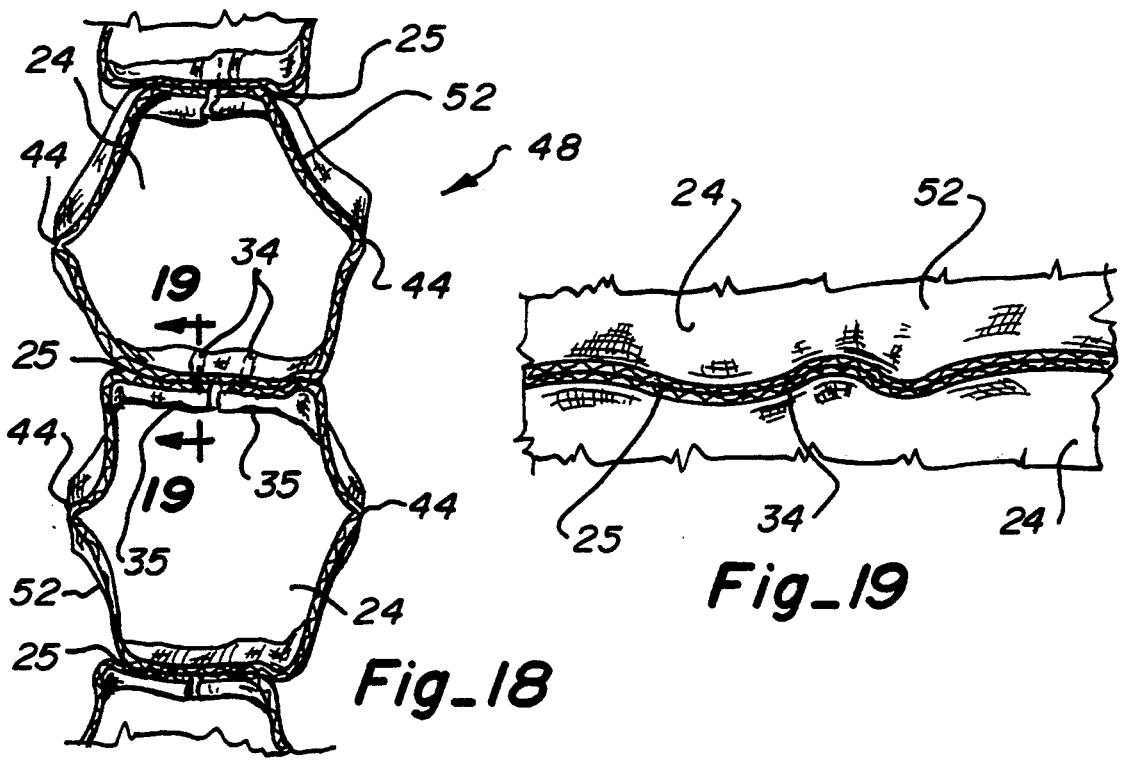
Fig_18
Fig_19

TUBULAR CELL WINDOW COVERING WITH UNDULATIONS ALONG THE LENGTH OF THE CELLS

BACKGROUND OF THE INVENTION

1. Field of the Invention

The present invention relates generally to expandable and collapsible window coverings comprised of a plurality of contiguous tubular cells and more particularly to such a window covering wherein the tubular cells are bonded to adjacent cells to form undulations along the length of the cells.

2. Description of the Prior Art

Window coverings formed from a plurality of collapsible contiguous tubular cells have acquired considerable desirability in recent years. The window coverings are desirable both from a utilitarian and aesthetic standpoint. From a utilitarian standpoint, air within each of the cells circulates only minimally such that when the shade is expanded so as to cover the window opening in which it is mounted, the covering provides good thermal insulation. From an aesthetic standpoint, since such window coverings are typically made of soft fabrics, they provide a softer appearance than conventional venetian blinds or minishades.

Window coverings made out of contiguous tubular cells are sometimes referred to as honeycomb panel window coverings and the tubular cells may extend horizontally or vertically depending upon the desired aesthetic appearance. There are various prior art disclosures relating to window coverings of the tubular cell type with the following being illustrative:

U.S. Pat. No. 4,347,887 to Brown shows a "Thermal Shutter." A wide band of material is folded transversely to form a double column of adjacent cells, which may have rounded visible contours. The cells are adhesively bonded to one another. The Brown structure is symmetrical, so that both sides of the shade thus formed have essentially the same appearance.

U.S. Pat. No. 4,450,027 to Colson shows a method and apparatus for fabricating a multiple cell shade wherein a continuous relatively narrow strip of fabric is folded longitudinally in order to define pleats in the shade material and the edges folded over on the center portion to create a tubular cell. Successive cells are assembled by applying an adhesive to folded-over edges of the cells and adhering each cell to the preceding cell when wound on a stacking rack.

U.S. Pat. No. 4,631,217 to Anderson shows in FIG. 3 a shade of asymmetrical construction. A rear wall section of each cell is essentially straight or linear when the shade is in its expanded position. The width of these wall sections thus define the spacing of the adjacent cells, while the front of each cell, containing more material, presents a pleaded outward appearance. The Anderson patent also discloses a method of forming an expandable and collapsible shade consisting of an assembly of horizontally parallel cells, in which the cell structure is formed from a material folded into a Z-shape rather than a U-shape as shown in the Colson patent.

U.S. Pat. No. 4,846,243 to Schneider shows a foldable window covering formed of a wide material folded transversely, as in the Brown patent, to yield a collapsible shade. The front surface of the shade consists of a number of drooping loops formed by doubling the material back on itself. The successive cells are spaced in the expanded position of the shade by a relatively vertical rear wall section of each shade.

As will be appreciated from the prior art, expandable and collapsible tubular cell window coverings have been characterized in having relatively straight lines of connection between adjacent cells. While this look may be desirable to many people, it is not totally satisfactory to all, and accordingly, variations in tubular cell window coverings have become desirable.

It is against this background and to provide a new aesthetically attractive and insulating window covering that the present invention has been made.

SUMMARY OF THE INVENTION

The present invention consists of an expandable and collapsible tubular cell type window covering wherein the cells are affixed or bonded to adjacent cells so as to create undulations or waves along the length of each cell. While the cells may be oriented horizontally or vertically, depending upon the hardware and aesthetics desired, the appearance of the window covering is quite distinct from any in the prior art while providing the desired insulating properties of tubular cell or honeycomb panel window coverings.

Three distinct embodiments of the invention are disclosed for bonding adjacent tubular cells to create a wavy appearance. In one embodiment, the cells are made from a stretchable fabric and the tubular cells are first stretched longitudinally into an elongated condition before an expansion or non-expansion adhesive is applied longitudinally to the cells. The cells are then bonded by moving them into compressed engagement and preferably after the adhesive has cured, the stretch is released so that only the fabric exposed to the adhesive is retained in an expanded or stretched condition while the remaining portions of the fabric are allowed to contract into their relaxed normal condition. The result is a honeycomb panel comprised of a plurality of bonded cells which are undulating or wavy along their length creating an unusual and desirable aesthetic appearance.

A second embodiment of the invention is composed of tubular cells made of a woven or similar fabric and wherein a bonding medium that expands upon curing is used to bond adjacent cells. The bonding medium is first applied to one cell along the length of the cell and that cell is moved into compressive engagement with an adjacent cell. The bonding medium on curing will expand and stretch the fabric with which it is in contact while the remaining portion of the fabric remains unstretched. Again, the contrast between stretched and unstretched portions of the fabric creates undulations or waves along the length of the bonded cells.

In a third embodiment of a tubular cell window covering, the lines of adhesive between adjacent cells are applied in a curved or non-linear orientation, such as a sinusoidal wave pattern. Once the cells have been bonded together, it has been found that the cells along their length will undulate or form a wave-type pattern creating the desired appearance for the window covering.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is an isometric view of a window opening having a window covering therein fabricated in accordance with a first or second embodiment of the present invention.

FIG. 2 is an enlarged fragmentary front elevation of the window covering shown in FIG. 1.

FIG. 3 is a further enlarged fragmentary section taken along line 3—3 of FIG. 2.

FIG. 4 is a fragmentary section taken along line 4—4 of FIG. 3.

FIG. 5 is a fragmentary section taken along line 5—5 of FIG. 3.

FIG. 6 is a fragmentary section taken along line 6—6 of FIG. 4.

FIG. 7 is an enlarged fragmentary section taken along line 7—7 of FIG. 4.

FIGS. 8A, 8B, and 8C are diagrammatic operative views illustrating the method of fabricating the window covering shown in FIG. 1.

FIG. 9 is a fragmentary section taken between two adjacent cells showing one configuration of the bond lines bonding the cells in accordance with a third embodiment of the invention.

FIG. 10 is a view taken along line 10—10 of FIG. 9.

FIG. 11 is an enlarged section taken along line 11—11 of FIG. 10.

FIG. 12 is an enlarged section taken along line 12—12 of FIG. 10.

FIG. 13 is a fragmentary section similar to FIG. 9 showing bond lines in a different orientation.

FIG. 14 is a fragmentary section similar to FIG. 13 showing bond lines between two tubular cells shown in solid line and between the two next adjacent tubular cells shown in dashed lines.

FIG. 15 is a fragmentary front elevation of a window covering wherein adjacent tubular cells are bonded with glue lines in accordance with FIG. 14.

FIG. 16 is an enlarged fragmentary section taken along line 16—16 of FIG. 15.

FIG. 17 is a fragmentary front elevation of a window covering made in accordance with either the first or third embodiment of the present invention when the fabric is a knit fabric.

FIG. 18 is an enlarged fragmentary section taken along line 18—18 of FIG. 17.

FIG. 19 is a fragmentary section taken along line 19—19 of FIG. 18.

DESCRIPTION OF THE PREFERRED EMBODIMENTS

Referring first to FIGS. 1-7, a window covering 20 made in accordance with a first embodiment of the present invention is illustrated in an installed condition in a window opening having a frame 22. The window covering is shown to be composed of a plurality of vertically contiguous horizontally extending tubular cells 24 which have been affixed or bonded along their length to define an integrated panel 26 of honeycomb construction. The panel of honeycomb construction is suspended from an upper head rail 28 with known hardware (not shown) for supporting and operating window coverings of the tubular cell type. An example of such hardware is disclosed in U.S. Pat. No. 4,647,488, which is of common ownership with the subject application, the disclosure of which is hereby incorporated by reference. A weighted bottom rail 30 is attached to the lowermost horizontal tubular cell 24 in a conventional manner to assist in moving the window covering from an open condition, wherein the tubular cells are vertically or transversely collapsed and stacked adjacent the head rail 28, to a closed position as illustrated in FIG. 1 with the tubular cells vertically or transversely expanded and the honeycomb panel entirely covering the window opening in which the window covering is mounted.

Tubular cells used in tubular cell window coverings are bonded together along their length in numerous ways with an illustrative system being disclosed in the afore-noted U.S. Pat. No. 4,450,027 to Colson. This patent is hereby incorporated by reference for purposes of illustrating how tubular cells may be formed by folding strips of fabric so that they can be subsequently bonded to adjacent similarly formed strips to form an integrated honeycomb panel of contiguous tubular cells. Bonding of two adjacent tubular cells could be accomplished in various ways but, depending on the formation of the cells, or the strips from which they are made, a line or a pair of lines of adhesive is usually applied along the longitudinal juncture 25 between adjacent cells. As will be appreciated, the longitudinal juncture lies in a plane which is substantially perpendicular to the integrated panel 26. While the tubular cells 24 could be formed from any desirable material, including artificial materials or naturally woven or knitted materials, the window covering embodiments of the present invention are preferably made from materials having fibers which have been woven or knitted. It will also be appreciated that depending upon the hardware utilized, the tubular cells could be oriented either horizontally or vertically depending upon the desired appearance for a window covering.

In accordance with the first embodiment of the present invention, the window covering 20 is made of a woven material or fabric 31 which is stretchable to some degree so that the fibers 32 (FIGS. 3 through 7) in the material can be stretched or otherwise separated from each other so as to assume a condition which is expanded relative to the relaxed or normal condition of the fibers in the material. Lines of adhesive 34 are applied to the strips of material which have been prefolded in accordance with the afore-noted Colson patent. The prefolded strips, for purposes of the present disclosure, are made from an elongated planar strip of material, the side edges 35 of which are folded over and onto a center portion 37 of the strip so that the side edges are juxtaposed and in overlying relationship with the center portion of the strip. As will be appreciated with the description that follows, the lines of adhesive are applied to the exposed faces of the side edges so that the side edges can be bonded to the exposed center portion of a next adjacent strip. After bonding successive strips in this manner, the folded strips define the tubular cells 24 which in combination comprise the integrated panel 26.

The lines of adhesive extend along the length of the strip and are applied after the strips have been stretched longitudinally so that when adjacent strips are moved into compressed engagement while being retained in the stretched condition, the adhesive will mingle with the fibers 32 in each adjacent strip or resultant tubular cell to bond the two cells together. The adhesive 34 may be a hot melt adhesive or other suitable adhesive such as a moisture cure urethane which upon curing will hold the fibers 32 with which it is engaged in the spread condition. The adhesive is allowed to cure before the stretch in the strips of material is released so that the adhesive will retain the fibers with which it is engaged in a stretched orientation while the remaining fibers in each strip are allowed to relax or assume their normal condition. If a moisture cure urethane is used, which by its nature expands upon curing, the stretched or spread condition of each cell can be released before the glue has cured as the glue will again stretch the affected fibers as it cures. FIG. 7 schematically illustrates the contrast between the spacing of the fibers with the spacing between the fibers embedded in the adhesive being designated by D and the spacing being the relaxed or non-embedded fibers being designated by D'.

The reaction of the fabric 31 to the adhesive when the afore-described procedure is utilized is illustrated in FIGS. 8A–8C. These figures are only intended to illustrate the reaction of a stretchable fabric to the application of adhesive in the above-noted manner and does not illustrate the bonding or combination of adjacent layers of fabric with the adhesive. FIG. 8A illustrates a strip of fabric having clamps 36 at opposite ends with the fabric being in a relaxed or normal condition. FIG. 8B shows the fabric having been stretched by the clamps 36 and adhesive 34 applied to one side of the fabric. FIG. 8C shows the fabric having been released from the clamps and illustrating the portion of the fabric encased in the adhesive 34 being retained in an expanded condition while the fabric that is not directly exposed to the adhesive having returned to the normal unstretched condition shown in FIG. 8A.

When successively bonding adjacent strips in accordance with the above procedure, a continuous honeycomb panel 26 can be formed of any desired width and length so as to fit a designated window opening. FIGS. 1 and 3 illustrate how the afore-described method affects the appearance of the bonded strips. As will be appreciated, a fairly uniform undulating or wavy pattern defining an undulate is created along the length of each strip which has been formed into a transversely collapsible tubular cell 24. The wavy pattern is probably best appreciated by reference to creases 27 in the front and rear side of each tubular cell as best seen in FIGS 1 and 3. The creases may or may not be present in the tubular cells used to form a honeycomb panel 26, but, for illustrative purposes, the creases are a convenient way of showing the wavy nature of the panel. FIG. 3 illustrates in an enlarged sectional view the relationship of the adhesive lines to portions of the tubular cells. It should be appreciated that the adhesive lines are applied in a linear and continuous manner as clearly seen in FIG. 4 to create the appearance best illustrated in FIGS. 1 and 2. FIG. 5 is a longitudinal section along a pair of bonded tubular cells 24 showing the wavy pattern created with this process. FIG. 6 is an enlargement showing the lines of adhesive 34 penetrating both layers of bonded fabric along the juncture of two tubular cells. FIG. 7 is a further enlarged view of a portion of two adjacent cells with part of the fibers 32 in each cell being exposed to the adhesive 34 and other fibers not. It can be seen clearly in FIG. 7 that the fibers that are not exposed to the adhesive have retracted into a much closer relationship than those fibers that are embedded in the adhesive which results in the undulating or wavy pattern along the length of the tubular cells.

It has been found that an identical or substantially identical wavy or undulating pattern defining an undulate surface as illustrated in FIGS. 1 through 7 can be created along the length of the cells with certain fabrics by using expandable glues or adhesives rather than pre-stretching the fabric strips from which the tubular cells 24 are created in accordance with the first embodiment of the invention. Fabrics which have been knitted have not been found to be as responsive to the use of expansion glues as are fabrics which have been woven.

Woven fabrics, on the other hand, when processed in accordance with a second embodiment of the present invention by utilizing an expandable cross-linking glue preferably of a moisture-cured urethane type, have been found to create the appearance illustrated in FIGS. 1 through 7. Hot melt glues do not seem to work as they do not expand the fabric upon curing like cross-linking glues. An example of a glue which has been found satisfactory for this purpose is a glue manufactured by Lord Chemical of Erie, Pa., and marketed under type 7411.

When fabricating a window covering in accordance with the second embodiment of the present invention, strips of woven fabric which have been formed, for example, in accordance with the teaching in the above-noted Colson U.S. Pat. No. 4,450,027, have adhesive applied thereto similarly to the process described in the Colson patent but wherein the adhesive is an expandable glue of the cross-linking type. As the glue cures, it expands and pulls with it the fibers with which it is in engagement. Of course, the fibers that are not engaged with the glue remain in a relaxed or normal relationship with each other. Accordingly, stretching or separating a portion of the fibers along the length of each tubular cell with the glue while not separating or stretching other fibers creates an undulating or wavy pattern along the length of the cells such that a completed honeycomb panel formed by bonding each adjacent cell in this manner resembles the panel illustrated in FIGS. 1-7.

A third embodiment for fabricating a tubular cell window covering 40 (FIGS. 9-12) having wavy or undulating tubular cells is fabricated by bonding adjacent cells with curved lines of adhesive 34. While the curved lines could take many different configurations dependent upon the final appearance desired for the window covering, FIGS. 9-12 illustrate one such arrangement wherein a pair of bond lines 43 are applied to the side edges 35 of one side of a tubular strip from which the window covering is fabricated with the lines being in a serpentine or sinusoidal pattern. In FIG. 9, both lines of adhesive are in phase. A suitable adhesive would be a hot melt adhesive of the type manufactured by EMS-American Grilon, Inc. of Charlotte, N.C. under the brand name Grilltex or the afore-noted moisture cure urethane would also be suitable. Due to the fact that the adhesive lines are non-linear, the adhesive creates a wavy or undulating pattern along the length of each cell 24 at its juncture 25 with an adjacent cell. The wavy appearance is created across the face 45 of the resultant honeycomb panel 42 even though the lines of adhesive are applied to the side edges 35 in a plane perpendicular to the faces of the panel. When the two lines 43 of adhesive are in phase as shown in FIG. 9, both faces of the resultant honeycomb panel 42 will have a substantially identical appearance. The only difference between the appearance of the two faces of the panel is that the waves or undulations on one face will be offset slightly from the same waves or undulations on the opposite face. The sectional views of FIGS. 11 and 12 show how the cells 24 undulate along their length depending upon the location of the section relative to the sinusoidal adhesive lines. The wavy pattern is created due to the fact that the adhesive lines gets closer to one edge 44 of a tubular cell than the other as the lines progress along the length of the cells thereby pulling the material up or down at intervals along the length of each cell to create the wavy pattern.

FIG. 13 shows a different adhesive line pattern but again the lines of adhesive 34 are sinusoidal. In this arrangement, however, the lines 46 are out of phase with each other by 180°. Each face of the resultant honeycomb panel would have an appearance similar to that shown in FIG. 10, only the waves or undulations themselves are in phase on opposite sides of the panel at the same location along the length of the cells 24 so that the faces of the panel are mirror images. Of course, as mentioned previously, the adhesive lines would not have to be sinusoidal nor would they have to be in phase or 180° out of phase, as any relative relationship between the adhesive lines or configuration of the adhesive lines so long as they were not linear would create some form of a wavy or undulating pattern along the length of the cells.

FIG. 14 shows a different arrangement wherein two adjacent cells are bonded together with a pair of 180° out of phase sinusoidal lines 47 of adhesive 34 (solid lines) formed as shown in FIG. 13, but wherein the adhesive lines 49 (dashed lines) along the next adjacent juncture of cells, while being formed in an identical pattern, are 180° out of phase with the adhesive lines 47 between the first mentioned adjacent cells. In other words, the pair of adhesive lines between two particular cells 24 are 180° out of phase with each other and the adhesive lines along the next adjacent juncture 25 of cells, while also being 180° out of phase with each other, are also 180° out of phase with the first mentioned pair of adhesive lines. This configuration and arrangement of adhesive lines creates a front elevational appearance of a panel 50 as shown in FIG. 15 and in cross section in FIG. 16.

It has been found with knitted fabrics 52, when utilizing either the first embodiment for forming a wavy line tubular cell window covering wherein the fabric is prestretched before applying the glue or in accordance with the third embodiment wherein the glue lines are applied in a curved pattern, the window covering takes on a random, non-uniform, wavy appearance. In other words, the knit fabric 52 reacts differently to the glue than does the woven fabric 31 described previously and while it creates an undulating or wavy pattern along the length of the cells 24 at their juncture 25 with each other, the pattern is unpredictable and non-uniform. The resultant honeycomb panel 48 has an appearance which might look like the panel illustrated in FIG. 17 or could take many other appearances with it being understood that the undulations are random even though the adhesive may have been applied uniformly and in straight lines. FIGS. 18 and 19 are sections through the panel 48 formed from a knit fabric in accordance with either the first or third embodiment of the invention and it can there be seen the random undulating pattern created along the length of the tubular cells.

It will be appreciated from the above-noted description of the present invention that window coverings of the expandable and collapsible type which have been made from elongated tubular cells can be formed in an interesting and aesthetically pleasing pattern. The pattern can be uniform or non-uniform and when uniform can be made in accordance with predesired configurations depending upon how glue lines are applied, the type of glue utilized, and the fabric material used to form the honeycomb panel. It should also be appreciated that one window covering could be formed using various combinations of the methods disclosed. Various combinations of the methods could be used in bonding the same two cells together or in bonding different cells together in the same window covering.

Although the present invention has been described with a certain degree of particularity, it is understood that the present disclosure has been made by way of example, and changes in detail or structure may be made without departing from the spirit of the invention, as defined in the appended claims.

We claim:

1. An expandable and collapsible window covering comprised of a plurality of elongated, transversely collapsible tubular cells bonded together longitudinally by at least one line of adhesive which extends along an area of engagement between adjacent cells, each said tubular cell having an undulate surface along its length.

2. The window covering of claim 1 wherein said line of adhesive is substantially sinusoidal in configuration.

3. The window covering of claim 2 wherein there are two lines of adhesive and each is substantially sinusoidal in configuration.

4. The window covering of claim 3 wherein said lines of adhesive extend in adjacent relationship and are substantially in phase with each other.

5. The window covering of claim 3 wherein said lines of adhesive are out of phase with each other.

6. The window covering of claim 5 wherein said lines of adhesive are 180° out of phase with each other.

7. The window covering of claim 3 wherein corresponding lines of adhesive which are separated by a tubular cell are approximately 180° out of phase.

8. The window covering of claim 4 wherein corresponding lines of adhesive which are separated by a tubular cell are approximately 180° out of phase.

9. The window covering of claim 3 wherein corresponding lines of adhesive which are separated by a tubular cell are in phase with each other.

10. The window covering of claim 5 wherein corresponding lines of adhesive which are separated by a tubular cell are in phase with each other.

11. The window covering of claim 1 wherein said tubular cells are made of fabric having fibers with a uniform construction pattern and wherein the fibers in the fabric along said lines of adhesive are spaced a greater distance than the fibers which are not along said lines of adhesive.

12. The window covering of claim 11 wherein said lines of adhesive are straight.

13. The window covering of claim 11 wherein said fabric is woven with said fibers.

14. The window covering of claim 11 wherein said fabric is knitted with said fibers.

15. The window covering of claim 12 wherein said fabric is woven with said fibers.

16. The window covering of claim 12 wherein said fabric is knitted from said fibers.

17. The window covering of claim 11 wherein said adhesive penetrates said fabric and retains the fibers with which the adhesive is engaged in a greater spacing than the spacing of the fibers with which the adhesive is not engaged.

18. An expandable and collapsible window covering comprised of a plurality of elongated, transversely collapsible tubular cells bonded together longitudinally to form a substantially sheet-like planar panel, said cells being bonded together by at least one line of adhesive which extends along a planar area of engagement between adjacent cells, each said tubular cell having an undulate surface along its length and wherein said substantially planar area of engagement lies substantially perpendicular to the plane of said substantially sheet-like panel.

19. The window covering of claim 18 wherein said line of adhesive is substantially sinusoidal in configuration.

20. The window covering of claim 19 wherein there are two lines of adhesive and each is substantially sinusoidal in configuration.

21. The window covering of claim 20 wherein said lines of adhesive extend in adjacent relationship and are substantially in phase with each other.

22. The window covering of claim 20 wherein said lines of adhesive are out of phase with each other.

23. The window covering of claim 22 wherein said lines of adhesive are 180° out of phase with each other.

24. The window covering of claim 20 wherein corresponding lines of adhesive which are separated by a tubular cell are approximately 180° out of phase.

25. The window covering of claim 21 wherein corresponding lines of adhesive which are separated by a tubular cell are approximately 180° out of phase.

26. The window covering of claim 20 wherein corresponding lines of adhesive which are separated by a tubular cell are in phase with each other.

27. The window covering of claim 22 wherein corresponding lines of adhesive which are separated by a tubular cell are in phase with each other.

28. The window covering of claim 18 wherein said tubular cells are made of fabric having fibers with a uniform construction pattern and wherein the fibers in the fabric along said lines of adhesive are spaced a greater distance than the fibers which are not along said lines of adhesive.

29. The window covering of claim 28 wherein said lines of adhesive are straight.

30. The window covering of claim 28 wherein said fabric is woven with said fibers.

31. The window covering of claim 28 wherein said fabric is knitted with said fibers.

32. The window covering of claim 29 wherein said fabric is woven with said fibers.

33. The window covering of claim 29 wherein said fabric is knitted from said fibers.

34. The window covering of claim 28 wherein said adhesive penetrates said fabric and retains the fibers with which the adhesive is engaged in a greater spacing than the spacing of the fibers with which the adhesive is not engaged.

35. An expandable and collapsible window covering comprised of a plurality of elongated, transversely collapsible, substantially non-elastic tubular cells bonded together longitudinally by at least one line of adhesive which extends along an area of engagement between adjacent cells, each said tubular cell having an undulate surface along its length.

36. An expandable and collapsible window covering comprised of a plurality of elongated, transversely collapsible tubular cells bonded together longitudinally to form a substantially sheet-like planar panel having a front and rear face, said cells being bonded together by at least one line of adhesive which extends along an area of engagement between adjacent cells, each said tubular cell being hollow and extending between said front and rear faces of said panel and having an undulate surface along its length.

37. An expandable and collapsible window covering comprised of a plurality of elongated, transversely collapsible tubular cells bonded together longitudinally by at least one line of adhesive which extends along an area of engagement between adjacent cells, each of said tubular cells being made of a single piece of material and having an undulate surface along its length.

* * * * *

UNITED STATES PATENT AND TRADEMARK OFFICE
CERTIFICATE OF CORRECTION

PATENT NO. : 5,390,720
DATED : Feb. 21, 1995
INVENTOR(S) : Wendell B. Colson, et al It is certified that error appears in the above-indentified patent and that said Letters Patent is hereby corrected as shown below:

Column 5, line 38:  "--undulate is--" should read -- undulate surface is --

Signed and Sealed this

Second Day of January, 1996

*Attest:*

BRUCE LEHMAN

*Attesting Officer*    Commissioner of Patents and Trademarks